(12) United States Patent
Kreh

(10) Patent No.: US 8,882,414 B2
(45) Date of Patent: Nov. 11, 2014

(54) METHOD AND SYSTEM FOR MILLING A BEVEL GEAR TOOTH SYSTEM IN A CONTINUOUS MILING PROCESS

(75) Inventor: Wilhelm Kreh, Radevormwald (DE)

(73) Assignee: Klingelnberg AG, Zurich (CH)

( * ) Notice: Subject to any disclaimer, the term of this patent is extended or adjusted under 35 U.S.C. 154(b) by 611 days.

(21) Appl. No.: 13/194,045

(22) Filed: Jul. 29, 2011

(65) Prior Publication Data
US 2012/0027531 A1 Feb. 2, 2012

(30) Foreign Application Priority Data

Jul. 29, 2010 (EP) .................................... 10171235

(51) Int. Cl.

| | |
|---|---|
| B23F 1/06 | (2006.01) |
| B23F 21/22 | (2006.01) |
| B23F 9/10 | (2006.01) |
| B23F 23/00 | (2006.01) |

(52) U.S. Cl.
CPC .............. B23F 9/105 (2013.01); B23F 21/226 (2013.01); B23F 23/006 (2013.01)
USPC .............................................. 409/26; 409/39

(58) Field of Classification Search
CPC .............. B23F 1/06; B23F 9/10; B23F 9/105; B23F 9/12; B23F 21/22; B23F 21/223
USPC .......... 409/25, 26, 27, 28, 31, 38, 39; 407/21, 407/22, 29
See application file for complete search history.

(56) References Cited

U.S. PATENT DOCUMENTS

| 1,788,639 | A | * | 1/1931 | Stonebraker | 409/51 |
|---|---|---|---|---|---|
| 1,969,843 | A | * | 8/1934 | Head | 409/26 |
| 2,324,182 | A | * | 7/1943 | Wildhaber | 409/44 |
| 2,334,366 | A | * | 11/1943 | Wildhaber | 409/51 |

(Continued)

FOREIGN PATENT DOCUMENTS

| CA | 2517724 | 12/2004 |
|---|---|---|
| CH | 317 210 A | 11/1956 |

(Continued)

OTHER PUBLICATIONS

European Search Report for European Patent Application No. EP 10 17 1235.

(Continued)

*Primary Examiner* — Daniel Howell
*Assistant Examiner* — Nicole N Ramos
(74) *Attorney, Agent, or Firm* — McCarter & English LLP

(57) ABSTRACT

Milling of a bevel gear tooth system in the continuous process, wherein a cutter head comprising a plurality of pairs of inner cutting edges and outer cutting edges is applied to a workpiece, the inner cutting edges are arranged on a smaller fly circle radius than the outer cutting edges and movements for a metal-cutting machining by milling are performed by a gear cutting machine where the bevel work gear and the cutter head run linkedly: performing a first continuous metal-cutting machining by milling using the gear cutting machine according to a first machine setting, wherein convex inner flanks on the bevel work gear are machined by the inner cutting edges; and performing a second continuous metal-cutting machining by milling using a gear cutting machine according to a second machine setting, wherein concave outer flanks on the bevel work gear are machined by the outer cutting edges.

11 Claims, 3 Drawing Sheets

(56) References Cited

U.S. PATENT DOCUMENTS

| | | | |
|---|---|---|---|
| 2,978,964 A * | 4/1961 | Wildhaber | 409/26 |
| 3,218,931 A * | 11/1965 | Kotthaus | 409/26 |
| 3,222,990 A * | 12/1965 | Rebeski | 409/26 |
| 5,000,632 A | 3/1991 | Stadtfeld | |
| 5,895,180 A * | 4/1999 | Stadtfeld | 409/13 |
| 5,961,260 A * | 10/1999 | Kasler et al. | 409/25 |
| 6,416,262 B1 * | 7/2002 | Ishimaru et al. | 409/1 |
| 6,536,999 B1 * | 3/2003 | Bradfield et al. | 409/26 |
| 6,632,052 B2 * | 10/2003 | Moeri et al. | 409/26 |
| 7,775,749 B2 * | 8/2010 | Ribbeck | 407/21 |
| 8,267,624 B2 * | 9/2012 | Ritter et al. | 409/25 |

FOREIGN PATENT DOCUMENTS

| | | |
|---|---|---|
| CN | 201026542 Y | 2/2008 |
| CN | 101733483 A | 3/2010 |
| CN | 201500830 U | 6/2010 |
| DE | 10 2005 058536 A1 | 6/2006 |
| EP | 0 421 106 A1 | 4/1991 |
| EP | 2 181 790 A1 | 5/2010 |
| EP | 2181789 A1 | 5/2010 |
| JP | 2002-273623 A | 9/2002 |
| JP | 2003-160648 A | 6/2003 |
| JP | 2006-525877 A | 11/2006 |
| JP | 2010-105155 A | 5/2010 |

OTHER PUBLICATIONS

Wildhaber, E., "Oerlikon Spiralkegelräder, Berechnungen, Herstellung und Optimierung", Schriftensammlung 1988/89, pp. 73-77, Werkzeugmaschinenfabrik Oerlikon-Bührle AG.

* cited by examiner

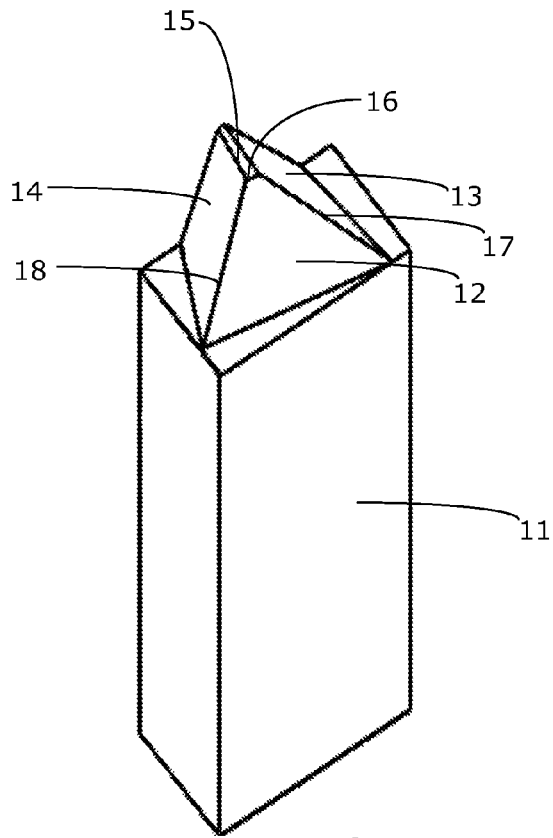
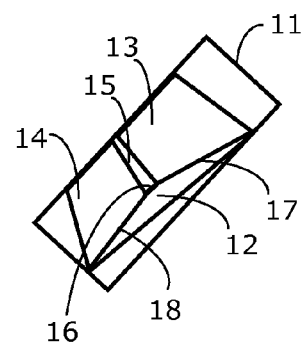
Fig. 2A
Fig. 2B
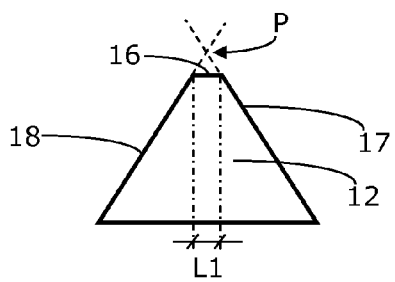
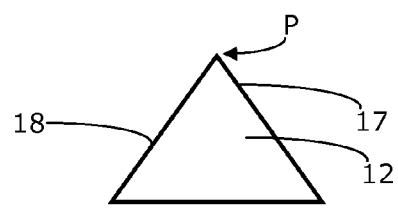
Fig. 2C
Fig. 2D

US 8,882,414 B2

METHOD AND SYSTEM FOR MILLING A BEVEL GEAR TOOTH SYSTEM IN A CONTINUOUS MILING PROCESS

CROSS-REFERENCE TO RELATED APPLICATIONS

This application claims priority under 35 U.S.C. §119(a)-(d) to European Patent Application No. EP 10171235.4, filed Jul. 29, 2010, the contents of which are hereby incorporated by reference in their entirety as part of the present disclosure.

FIELD OF THE INVENTION

The present invention relates to milling a bevel gear tooth system in a continuous milling process, and in particular, to the milling of a spiral-shaped bevel gear tooth system.

BACKGROUND OF THE INVENTION

There are numerous methods for machining toothed wheels. In the chip-producing production of spiral bevel gears, a distinction is made between the single indexing process and the continuous process, which is also sometimes referred to as the continuous indexing process.

In the continuous process (also referred to as face hobbing), for example, a cutter head tool comprises inner cutters and outer cutters, which are arranged group-wise, and is applied to a workpiece for cutting the convex and concave flanks of the workpiece. That is, the workpiece is completely cut in a single clamping in the non-stop process. The continuous process is based on very complex coupled sequences of movements in which the tool and the workpiece to be machined perform a continuous indexing movement. The indexing movement results from the coordinated driving of a plurality of axle drives of a corresponding machine. In the continuous indexing method, the rotation of the cutter head and the work-piece to be machined are coupled such that each time only one cutter group moves through a tooth gap and the next cutter group moves through the next space. The indexing is thus carried out continuously and all gaps are generated virtually simultaneously. By these coupled movements, an extended epicycloid results as a longitudinal flank line on the crown gear of the bevel gear to be produced. In the continuous process, the cutters of a cutter group are arranged one behind another with a phase angle, wherein the cutting edges of the outer and inner cutters intersect in a common projected plane.

In the indexing process (also called single indexing process or face milling), one tooth gap is machined, then a relative displacement movement is carried out for backing out the tool from a tooth gap and thus allowing a so-called indexing movement (indexing rotation), in which the workpiece rotates relative to the tool before the next tooth gap is machined. Thus, a toothed wheel is fabricated step by step. In the single indexing process, a first cutter head comprising inner cutters and outer cutters can be applied for cutting inner flanks (convex tooth flanks) on the workpiece and for preliminarily machining outer flanks. The outer cutters do not produce the final geometry of the outer flanks. Then, the first cutter head can be replaced by a second cutter head provided with outer cutters for cutting the final outer flanks (concave tooth flanks) on the workpiece. This procedure is also called single-side cutting. The cutting edges of the tool are arranged circularly (e.g. for a face cutter head) and the flank lines generated on the workpiece thus have the shape of a circular arc.

In the single indexing process described, the replacement of a cutter head takes place, which leads to a prolongation of the total machining time duration on one hand and that can involve inaccuracies on the other hand, as each clamping change or new clamping can lead to small deviations from the ideal position. The indexing process further has the disadvantage that it involves so-called indexing errors. It is an advantage of the single-side single indexing process involving two separate cutter heads that both tooth flanks can be optimized virtually independent from each other.

The so-called completing process is a special single indexing process, which is preferably employed in mass production. In the completing process, the crown gear and the pinion gear are machined and completely finalized in a two-flank-cut. With respect to other single-indexing processes, the completing process is characterized by a higher productivity (double chipping capacity); however a change of the flank shape is more difficult because changes in the kinematics of the machine will always have an influence on both flanks, just as with all processes comprising a two-flank-cut. It is thus a disadvantage of the completing process that a change of a flank by means of the kinematics of the machine always involves a change of the other flank. Changes are therefore possible only if they are "compatible with two-flank-cutting."

Accordingly, a distinction is essentially made also between machines working according to the indexing process and machines working continuously.

The so-called multicut or OERLIKON multicut gear cutting process, which is described, for example, in the document "OERLIKON Spiralkegelräder, Berechnungen, Herstellung and Optimierung" (in English: "OERLIKON spiral bevel gears, calculations, manufacturing and optimization"), Schriftensammlung (English: collection of documents) 1988/89, Werkzeugmaschinenfabrik Oerlikon-Mihrle AG, OERLIKON Ver-zahnungsmaschinen (English: OERLIKON gear cutting machines) on pages 73 to 77, is denominated as the closest state of the art.

SUMMARY OF THE INVENTION

It is an object of the present invention to provide methods and systems for milling the tooth flanks of a gear wheel, which provides a good tooth bearing pattern and good surface properties of the tooth flanks and which is characterized by a good productivity. The reduction of the machining time per toothed wheel is an aim of the invention.

According to the present invention, this object is provided by a method, which can rudimentarily be compared with the semi-completing process, that is utilized in the grinding in the single indexing process of tooth systems that have been pre-milled in the cyclopalloid process (German: Zyklo-Palloid-Verfahren).

In one aspect, the two flanks (i.e. the convex inner flanks and the concave outer flanks) of the bevel gear are milled continuously with separate machine settings, but using the same tool. To this end, the tool radii required for the machining of the concave and the convex flanks are provided on a common cutter head. The inner cutting edges for the milling machining of the convex inner flanks of the bevel work gear are arranged on a first fly circle radius. The outer cutting edges for the milling machining of the concave outer flanks on the bevel work gear are arranged on a second fly circle radius. The first fly circle radius is smaller than the second fly circle radius. By the prescription of the different fly circle radii, both the inner cutting edges and the outer cutting edges can be accommodated on one and the same cutter head, and in some embodiments on one and the same bar cutter. As the fly circle radius is related with the follow angle, the machine settings are accordingly adapted.

For example, a change of the angle between the inner and outer cutters (this angle is called the follow angle) in the continuous process leads to a change of the tooth thickness, while it has no effect in the single indexing process. Thus, modifications of the machine settings have to be carried out in order to compensate or correct changes of the tooth thickness (tooth thickness error), the spiral angle (spiral angle error) and other aspects.

As compared to the above-mentioned multicut process, in certain aspects of the present invention, the bevel gear pinion and crown gear are manufactured single-sidedly and are respectively machined using a cutter head comprising double-sided cutters or comprising inner and outer cutters.

According to other aspects of the present invention, a cutter head is applied to the workpiece that is designed and provided with cutters such that the fly circle radius of the outer cutters is larger than the fly circle radius of the inner cutters. That is, different fly circle radii are envisaged.

According to another aspect, the convex and concave flanks of the bevel gear are milled with separate machine settings.

Thus, according to certain aspects, a continuous semi-completing milling process is concerned, i.e., a method, in which aspects of the semi-completing method are applied in a continuous milling process.

As mentioned, modifications of the machine settings may have to be carried out, because the semi-completing single indexing process cannot be transferred in a 1:1 manner. These modifications are required for positioning the tooth bearing pattern approximately in the tooth center of the teeth to be produced.

It is an advantage of the invention that it is neither required to replace (change the clamping) the tool nor that a double head machine comprising two different tools need be employed.

The methods according to the invention can be performed both as a dry or a wet processing.

Other advantages and features of the invention become apparent from the other claims as well as from the following description of an exemplary embodiment of the invention, which shall be understood not to be limiting and which will be explained below with reference to the drawings.

BRIEF DESCRIPTION OF THE DRAWINGS

Further details and advantages of the invention are described in the following exemplary embodiment and with reference to the drawings.

FIG. 2A is a perspective view of a bar cutter of the present invention;

FIG. 2B is a top view of the bar cutter of FIG. 2A;

FIG. 2C is a schematic view of a rake face of a bar cutter according to the present invention having a positive distance between centers;

FIG. 2D is a schematic view of a rake face of an example bar cutter having a negative distance between centers;

DETAILED DESCRIPTION OF EMBODIMENTS OF THE INVENTION

In relation with the present description, terms are used which also find application in pertinent publications and patents. It is noted, however, that the use of these terms is to simply serve for a better comprehension. The inventive idea and the scope of the patent claims is not to be limited in their interpretation by the specific choice of the terms. The invention can be transferred without further ado to other terminology systems and/or technical fields. In other technical fields, the terms should be used analogously.

In the previously known continuous process, both tooth flanks are machined with the same tool radius (except corrections for generating the crowning etc.). The main cutting edges of the corresponding inner and outer cutters cross each other in the pitch plane. The inner cutter follows the outer cutter with an angular distance $\pi/z_0$. Herein, $z_0$ is the number of gears.

Figure 1A:
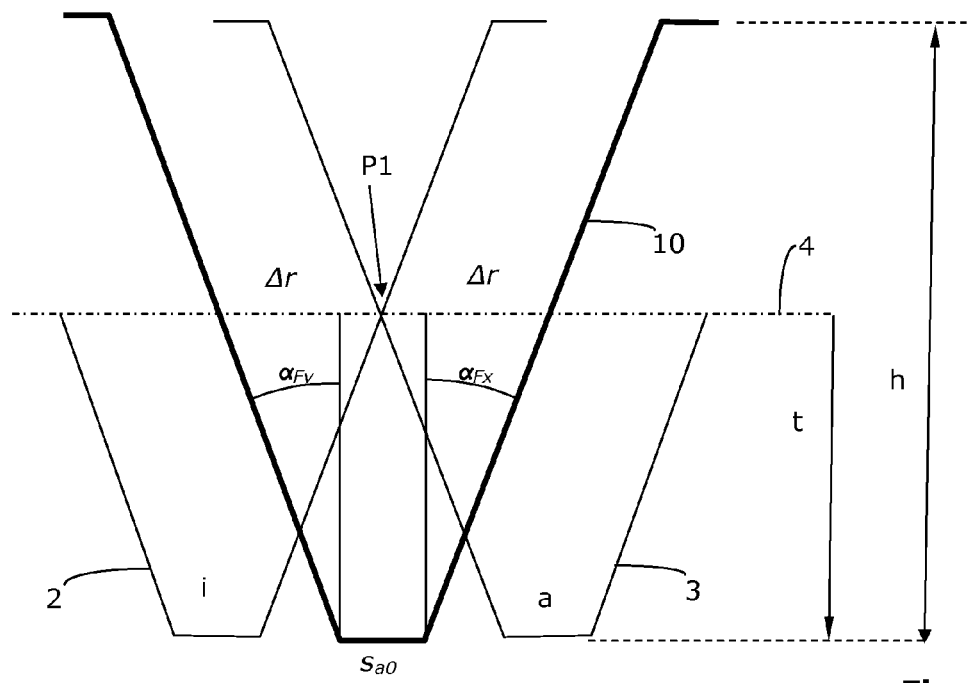
FIG. 1A is a schematic representation for combining an inner cutter with an outer cutter on a bar cutter including cutting edges having a positive distance between centers.
Figure 1B:
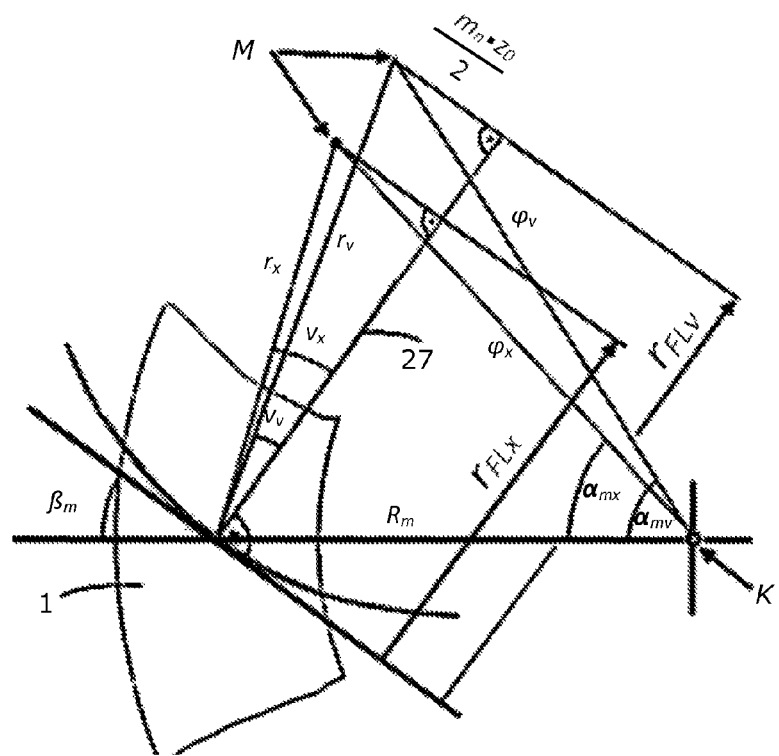
FIG. 1B is an illustration further detailing the geometric derivation.

When the inner cutter 2 is joined with the outer cutter 3 to yield a single bar cutter 10 having a tip width $s_{a0}$, as is the case in the present invention, the cutting edges are separated from each other by $2 \cdot \Delta r$. Either one of the two cutting edges is shifted by the whole amount, or both cutting edges a and i (refer to FIG. 1A) are each shifted by one half the whole amount (i.e. by $\Delta r$). Herein, $\Delta r$ corresponds to the displacement of a cutter in the sloping direction 27 (as shown in FIG. 1B). The contours of an inner cutter 2 and of an outer cutter 3 are represented in FIG. 1A by thin lines. The contour of the new bar cutter 10 is represented by a thicker line.

In this case, the cutter flank for producing the convex flank is set to a smaller radius and the cutter flank for generating the concave flank is set to a larger radius, namely such that a positive tip width $s_{a0} \approx 0.32 \cdot m_n$ of the cutter is generated (wherein $m_n$ is the mean normal module). The corresponding change of the radius should not occur radially, but should occur in the slope direction 27 (FIG. 1B). In FIGS. 1A and 1B, the different geometric quantities are labeled with an "x" for convex or a "v" for concave.

In FIG. 1A, a representation is shown, from which it can be seen how two single outer cutting edges a and inner cutting edges i can be combined such that a positive distance between centers $s_{a0}$ results. The following equations describe the geometric relationships of the situation shown in FIG. 1A in more detail:

$$\Delta r = \frac{s_{a0} + t \cdot (\tan\alpha_{F_x} + \tan\alpha_{F_v})}{2}$$

$$r_{FL_{x,v}} = \sqrt{r_w^2 - \left(\frac{m_n z_0}{2}\right)^2} \pm_x^v \Delta r$$

$$r_{x,v} = \sqrt{r_{FL_{x,v}}^2 + \left(\frac{m_n z_0}{2}\right)^2}$$

Herein, $\alpha_{F_x}$ is the cutter flank angle for generating the convex tooth flank and $\alpha_{F_v}$ is the cutter flank angle for generating the concave tooth flank. The symbol t represents the tip height of the bar cutter 10 and measures the distance from the reference plane of the profile to the cutter tip. The reference line of the profile is represented in FIG. 1A by the dot-dashed line 4. The symbol h is the cutter profile height, which is, for practical considerations, slightly greater than the tooth profile to be produced. In the profile reference line 4, the cutter profiles intersect at the calculation point P1. The profile reference line 4 serves as a design parameter for designing the bevel gear tooth system. In the calculation point P1, both cutters 2 and 3 have the same fly circle radius. The symbol $r_{FLx,v}$ in the above equations refers to the tool radii of the outer and inner cutter in the sloping direction, $r_w$ refers to the cutter head nominal radius and $m_n$ refers to the mean normal module. The symbol $r_x$ represents the fly circle radius of the cutting edge for the convex flank and $r_v$ the fly circle radius of the cutting edge of the concave flank.

Along with the changed radii, the radials $\phi$ and the mean generating position (also called generating pivot angle) $\alpha_m$ (refer to FIG. 1B) are also adapted such that the same desired mean spiral angle $\beta_m$ results on both flanks. It can be seen from FIG. 1B that the radial $\phi_v$ differs from the radial $\phi_x$. Also, the generating pivot angles $\alpha_{mx}$ and $\alpha_{mv}$ differ from each other. In the change-over from a first machine setting to a second machine setting, which occurs during a short interruption of a milling process, these parameters are changed.

In FIG. 1B, further details of the geometric derivation are shown. The symbol M in FIG. 1B denotes the center of the cutter head 20. The symbol K denotes the revolving axis. A part of the virtual crown gear is indicated in FIG. 1B. The following equations describe the geometric relationships of the situation shown in FIG. 1B in more detail:

$$\sin v_{x,v} = \frac{m_n \cdot z_0}{2 \cdot r_{x,v}}$$

$$\varphi_{x,v} = \sqrt{r_{x,v}^2 + R_m^2 - 2 \cdot r_{x,v} R_m \sin(\beta_m - v_{x,v})}$$

$$\sin \alpha_{m_{x,v}} = \frac{r_{x,v}}{\varphi_{x,v}} \cos(\beta_m - v_{x,v})$$

Herein, $v_x$ and $v_v$ are geometric auxiliary quantities for the derivation, $\beta_m$ is the mean spiral angle in the calculation point P1 and $R_m$ is the mean length of the pitch cone.

When switching from the machining of the convex tooth flank to the machining of the concave tooth flank, i.e., when changing over from the first to the second machine setting during a short interruption of a milling process, the crown gear has to be rotated by one half indexing and the workpiece (bevel work gear) has to be rotated according to the ratio of the number of crown gear teeth $z_p$ to the corresponding number of teeth z of the workpiece gear. This rotation $a_\beta$ results from the following equation:

$$a_\beta = \frac{m_n \cdot \pi}{2 \cdot R_m} \cdot \frac{z_p}{z}$$

According to one embodiment, a bar cutter 10 according to FIGS. 2A and 2B is applied to the workpiece. The bar cutter 10 includes a shaft 11. The shape of the shaft 11 is chosen such that the bar cutter 10 can be fixed safely and exactly in a corresponding cutter groove or chamber 21 of a cutter head 20. The cross section of the shaft 11 can be rectangular or polygonal, for example.

In the head area of the bar cutter 10, there is located a first relief face 14 (A-side or tool flank A), a second relief face 13 (B-side or tool flank B), a (common) rake face 12, a head tool face 15, a first cutting edge 18, a second cutting edge 17 and a head cutting edge 16.

The rake face 12 intersects with the first relief face 14 in a virtual intersection line, which corresponds approximately with the course of the first cutting edge 18 or that corresponds exactly with the course of the first cutting edge 18. The rake face 12 intersects with the second relief face 13 in a virtual intersection line, which corresponds approximately to the course of the second cutting edge 17 or that corresponds exactly with the course of the second cutting edge 17.

In various embodiments, the different faces of the bar cutter 10, which form the proper cutter profile, may be generated by grinding a rod-shaped main body.

In various embodiments, the cutter profile of the bar cutter 10 may have a special cutter head geometry (arrangement of the faces, cutting edges and angles) in which both the inner cutter and the outer cutter have been combined to a single bar cutter 10. The geometry of the bar cutter 10 may be chosen such that when in the prescription of a first machine setting the first cutting edge 18 serves as an active cutting edge on the gear cutting machine for cutting, for example, the convex inner flanks on the bevel work gear in the continuous process. When in the prescription of a second machine setting, which differs from the first machine setting, the second cutting edge 17 serves as an active cutting edge for cutting, for example, the concave outer flanks on the same bevel work gear in the continuous process. Without such geometry the cutter head 20 would have to be clamped differently or another cutter head would have to be clamped for this purpose.

In various embodiments, the first cutting edge 18 and the second cutting edge 17 are arranged on a bar cutter 10 such that both cutting edges 17, 18 define a positive distance between centers (i.e. L1>0 in FIG. 2B). In FIG. 2A, an example of such a bar cutter 10 is shown in which the distance between centers is positive, i.e., in which a head cutting edge 16 having a length L1>0 results in the tip area (refer, e.g., to FIG. 2C). If both cutting edges 17, 18 are arranged such that a positive distance between centers does not result, then the tool flank 12 has, e.g., a real tip which is defined by the intersection point P of both cutting edges 17, 18 (refer, e.g., to FIG. 2D). It is to be noted that FIG. 2D represents a special case. In the conventional continuous process, there would even be a negative distance between centers, i.e., in this case, the tip P would be located deeper.

In various embodiments, which work with separate inner and outer cutters (i.e., when the inner and outer cutters are arranged in relation with each other with a follow angle), the inner and outer cutters are arranged in a spatial relationship such that a positive distance between centers results in a projection of the inner and outer cutters in a common plane.

In FIG. 2B, further details of an embodiment of the bar cutter 10 are shown in a schematic top view. In the top view, details of the geometry of the front area of the bar cutter 10 can be recognized, wherein it is to be noted that the cutting edges, respectively, have a slight rounding radius, which is, however, not represented in the schematic drawings.

In FIG. 2C, a common rake face 12, which is defined by two cutting edges 17, 18 having a positive distance between centers, is shown in a schematic view. The rake face 12 may be trapezoidal, wherein both cutting edges 17, 18 typically do not have, but may have, the same length or slope. The cutting edges 17, 18 define an intersection point P located above (outside of) the plane of the rake face 12. In its upper region, the rake face 12 ends at a head cutting edge 16 having a cutting length L1. In practice, the head cutting edge 16 is generally not a straight line. Typically, the flank cutting edges 17, 18 transition to the head cutting edge 16 having a radius, which is not shown in the schematic representations of FIGS. 2A to 2C. Due to the curvature of the head cutting edge 16, the length of $s_{a0}$ is greater than the length of L1.

In FIG. 2D, a rake face 12, which is defined by two cutting edges 17, 18 that do not define a positive distance between centers, is shown in a schematic view. In principal, this concerns a special case involving a triangular rake face 12, wherein the intersection point P coincides with one of the three corners of the triangle.

By choosing a bar cutter geometry having a positive distance between centers, the outer cutting edge 17 and the inner cutting edge 18 can be accommodated on a common bar cutter 10 such that the convex inner flank can be cut using a first machine setting and the concave outer flank on the bevel work gear can be cut independently therefrom using a second machine setting. Without this geometry one of the cutting edges 17, 18 would possibly cause errors or inaccuracies when cutting the respective other flank.

Figure 3A:
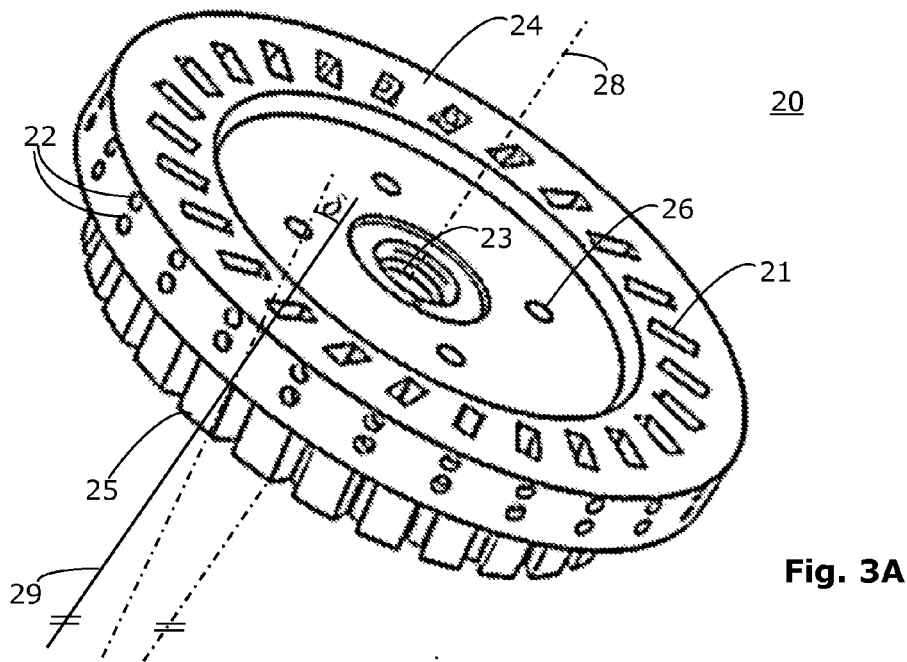
FIG. 3A is a perspective view of a cutter head of the present invention.

A plurality (here: N=26) of such bar cutters 10 are provided on a cutter head 20, which is shown in different views in FIGS. 3A and 3B. Here, the cutter head 20 comprises twenty-six (26) cutter grooves or chambers 21, which are inclined from the cutter head plan face 25 to the cutter head face 24 approximately in the direction of slope of the cutter head 20. The cutter grooves or chambers 21 are rotated with respect to the circumferential direction by γ (FIG. 3B) so as to possibly yield uniform rake angles on the A-side and the B-side of the bar cutter 10. In FIG. 3A, an auxiliary line HL is drawn to illustrate the slope 5. The dimension line 29 runs parallel to the cutter head axis 28.

Figure 3B:
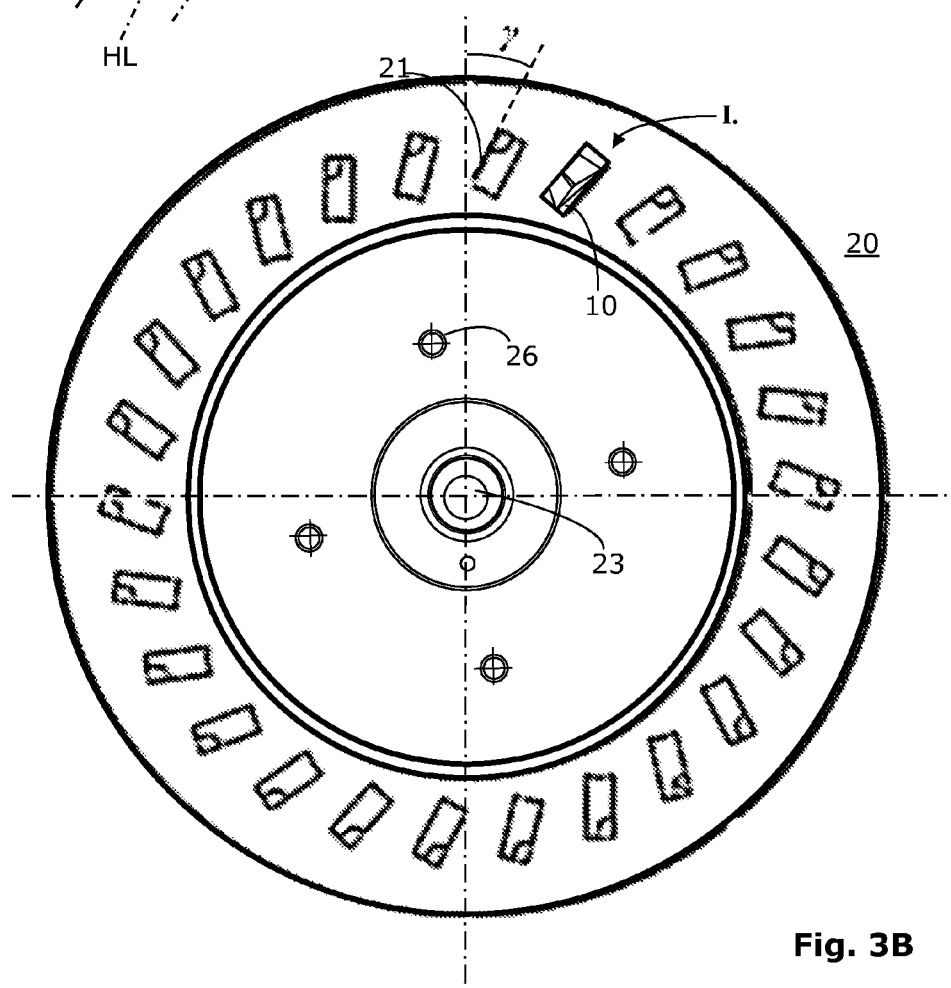
FIG. 3B is a top view of the cutter head of FIG. 3A.

In FIG. 3B, a built-in bar cutter 10 according to FIG. 2B is shown in a position I. The other cutter grooves or chambers 21 are not yet occupied at the moment shown. It can be seen from this one bar cutter 10 how the cutting edges 17, 18 would move in space when the cutter head 20 makes a clockwise rotation about the center rotation axes (cutter head axis 28). During a clockwise rotation, using the first machine setting for example, the cutting edges 18 would cut one inner flank after the other on the cone machine gear. Then, after a second machine setting has been prescribed and set, the cutting edges 17 would cut one outer flank after the other on the bevel work gear. The tilt γ of the cutter grooves is indicated in FIG. 3B.

Depending on the choice of the machine settings and the specific geometry of the bar cutter 10, it is possible that, in the first machine setting, the cutting edge 18 cuts an inner flank, while the cutting edge 17 cuts an opposite (provisional) flank. This happens, for example, in cases when the bar cutter 10 of the cutter head 20 moves into a blank on which no tooth gaps have been pre-machined. In this case, the bar cutter 10 works using virtually its full profile. The opposite provisional flank, which is cut virtually simultaneously with the inner flank, however, does not correspond to the final outer flank of the same tooth gap. The outer flank is then cut only by the cutting edge 17 and finalized after the second machine setting has been prescribed.

An embodiment of a method for milling a bevel gear tooth system is as follows. The method concerns a continuous process, wherein a cutter head 20 (e.g., according to FIG. 3A, 3B) is applied to a workpiece, the cutter head 20 includes a plurality of pairs of inner cutting edges 18 and outer cutting edges 17. One inner cutting edge 18 and one outer cutting edge 17, respectively, may be arranged on a bar cutter 10 (e.g., according to FIG. 2A, 2B) as a pair. The inner cutting edges 18 are arranged on a smaller fly circle radius than the outer cutting edges 17. The movements for a chip-producing machining by milling are performed by a gear cutting machine such that both the bevel work gear and the cutter head 20 run linkedly.

According to one embodiment, a continuous chip-producing machining by a milling is performed by the gear cutting machine, wherein convex inner flanks on a bevel work gear are machined using the inner cutting edges 18, and wherein this first continuous chip-producing machining by milling is carried out using a first machine setting. Then, a continuous chip-producing machining by milling is performed by the gear cutting machine, wherein concave outer flanks on the bevel work gear are machined using the outer cutting edges 17, and wherein the second continuous chip-producing machining by milling is carried out using a second machine setting. The sequence of these method steps may also be reversed. In this case, the concave outer flanks would be machined first and then, subsequently, the convex inner flanks.

It should be noted here, again, that embodiments are also conceivable in which the inner cutting edges and the outer cutting edges, which follow each other with the follow angle, may be accommodated on separate bar cutters.

A first continuous chip-producing machining by milling is performed by the gear cutting machine, wherein convex inner flanks on the bevel work gear are machined with application of the inner cutting edges 18, and wherein this first continuous chip-producing machining by milling is carried out using a first machine setting. Then, a second continuous chip-producing machining by milling is performed by the gear cutting machine, wherein concave outer flanks on the bevel work gear are machined with application of the outer cutting edges 17 and wherein this second continuous chip-producing machining by milling is carried out using a second machine setting.

For each cutter groove or chamber 21, two threaded holes 22 (refer to FIG. 3A) for fastening screws of the bar cutter 10 may be disposed in the peripheral surface of the cutter head 20. In addition, there is a central bore 23 for a central fastening screw, as well as four additional bores 26 for four additional fastening screws. The rotation access of the cutter head 20 is defined by the center of the central bore 23. The corresponding cutter head axis 28 is indicated in FIG. 3A.

In various embodiments, a monoblock cutter head (a one-piece cutter head) may be utilized as the cutter head 20.

In various embodiments, a cutter head 20 may be utilized in which all cutter grooves or chambers 21 have the same form, position and slope tilt. The two different fly circle radii result from the geometry of the frontal area of the bar cutters 10. Due to the respective machine settings, the respective active cutting edges (e.g., the cutting edges 18 for the machining of the inner flanks and the cutting edges 17 for the machining of the outer flanks) are positioned and guided through the raw material of the bevel work gear.

In various embodiments, the cutter grooves or chambers 21 may be fabricated using an erosion method so as to make them fit accurately.

In various embodiments, one bar cutter 10 for each cutter group of the cutter head 20 may be utilized. Such a cutter head 20 is shown in the FIGS. 3A, 3B. However, also two or more bar cutters may be utilized for each cutter group.

In various embodiments, bar cutters 10 may be utilized that have a rake angle that is zero or close to zero.

As should be recognized by those of ordinary skill in the pertinent art based on the teachings herein, numerous changes and modifications may be made to the above-described and other embodiments of the present invention without departing from its scope as defined in the appended claims. Accordingly, this detailed description of embodiments is to be taken in an illustrative, as opposed to a limiting, sense.

What is claimed is:

1. A method of milling a bevel gear tooth system, comprising:
providing a cutter head comprising a plurality of pairs of inner cutting edges and outer cutting edges, wherein the inner cutting edges define a smaller fly circle radius than the outer cutting edges;
clamping said cutter head in a gear cutting machine;
providing a bevel gear workpiece;
clamping the bevel gear workpiece in the gear cutting machine;
performing a first continuous metal-cutting machining of the bevel gear workpiece by continuous milling using said cutter head mounted in the gear cutting machine in a first machine setting, whereby convex inner flanks are machined on the bevel gear workpiece by the inner cutting edges; and
after performing the first continuous metal-cutting machining, performing a second continuous metal-cutting machining of the bevel gear workpiece by continuous milling using said cutter head mounted in the gear cutting machine in a second machine setting that is different from the first machining setting, whereby concave outer flanks are machined on the bevel gear workpiece by the outer cutting edges,
wherein, during the machining steps, movements of the cutter head and bevel gear workpiece are coupled.

2. The method according to claim 1, wherein the step of providing a cutter head includes providing the cutter head with a plurality of bar cutters each having a head geometry comprising a first relief face, a second relief face and a rake face therebetween, wherein the inner cutting edge is defined by a virtual intersection line at an intersection of the first relief face and the rake face, and the outer cutting edge is defined by a virtual intersection line at an intersection of the second relief face and the rake face.

3. The method according to claim 1, wherein the step of providing a cutter head includes providing the cutter head with a plurality of bar cutters, each comprising a pair of said inner cutting edges and said outer cutting edges and a rake face, wherein the inner cutting edge and the outer cutting edge intersect at a projected location outside of, but in a plane of, the rake face.

4. The method according to claim 1, wherein the inner cutting edge and the outer cutting edge of each pair define a positive distance between their centers.

5. The method according to claim 1, wherein said milling is a non-stop continuous milling process performed in one clamping of the bevel gear workpiece, and the first machine setting is changed to the second machine setting during a short interruption of said milling process.

6. The method according to claim 1, wherein a virtual crown gear is rotated by one half flank indexing and the bevel gear workpiece is rotated according to a ratio of a number of crown gear teeth to a corresponding number of bevel gear workpiece teeth during changing from the first machine setting to the second machine setting.

7. The method according to claim 1, wherein a first generating pivot angle ($\alpha_{mx}$) is changed to a second generating pivot angle ($\alpha_{mv}$) and a first radial ($\phi_v$) is changed to a second radial ($\phi_x$) during changing from the first machine setting to the second machine setting.

8. The method according to claim 1, wherein at least one of the machine settings is set to produce a tooth bearing pattern on tooth flanks of the bevel gear tooth system located approximately in a center of a tooth thereof.

9. The method according to claim 1, wherein the milling process is a continuous face milling process and a crown gear and the bevel work gear are rotated.

10. The method according to claim 1, wherein the milling process comprises a semi-completing milling process.

11. The method according to claim 1, wherein the machining steps produce a spiral-shaped bevel gear tooth system.

* * * * *